United States Patent [19]
Ichiki et al.

[11] Patent Number: 5,635,142
[45] Date of Patent: Jun. 3, 1997

[54] NOX ADSORPTION AND REMOVAL APPARATUS

[75] Inventors: Masayoshi Ichiki, Osaka; Teruo Iwamoto, Kaizuka; Takanobu Watanabe, Kyoto; Hidetsugu Kobayashi, Osaka; Seietsu Kikuchi, Sakai; Kaizo Agari, Neyagawa; Atsushi Fukuju, Toyonaka; Akihiro Usutani, Soraku-gun, all of Japan

[73] Assignee: Hitachi Zosen Corporation, Osaka, Japan

[21] Appl. No.: 291,894

[22] Filed: Aug. 17, 1994

[30] Foreign Application Priority Data

Aug. 24, 1993 [JP] Japan ................................ 5-209680
Mar. 9, 1994 [JP] Japan ................................ 6-038252

[51] Int. Cl.$^6$ ................................................. B01D 53/34
[52] U.S. Cl. .................... 422/177; 422/171; 422/172; 422/173; 422/175; 422/178; 96/130; 96/143; 96/144
[58] Field of Search ........................ 422/169–173, 422/175, 178, 189, 223, 234, 235; 423/235; 95/128, 129, 148; 96/130, 127, 133, 143, 144

[56] References Cited

U.S. PATENT DOCUMENTS

| 3,729,902 | 5/1973 | Ventriglio et al. | 96/127 |
| 5,158,582 | 10/1992 | Onitsuka et al. | 96/130 |

FOREIGN PATENT DOCUMENTS

| 42 09 962 C1 | 9/1993 | Germany. |
| 05 192535 | 8/1993 | Japan. |
| 05 200283 | 8/1993 | Japan. |
| 2 238 489 | 6/1991 | United Kingdom. |

*Primary Examiner*—Robert J. Warden
*Assistant Examiner*—Hien Tran
*Attorney, Agent, or Firm*—Armstrong, Westerman, Hattori, McLeland, & Naughton

[57] ABSTRACT

The invention discloses a NOx adsorption and removal apparatus employed in the method of passing NOx containing gas into the adsorber 1 filled with NOx adsorbent to adsorb a specific volume of NOx on the adsorbent, passing hot air into the adsorber to desorb NOx, and regenerating the adsorbent, wherein the adsorber is divided in plural zones arranged parallel in the gas flow direction. In this invention, by regenerating after adsorbing NOx in each zone, the regenerating apparatus can be reduced in size, and the energy may be saved by effective utilization of preheat.

3 Claims, 4 Drawing Sheets

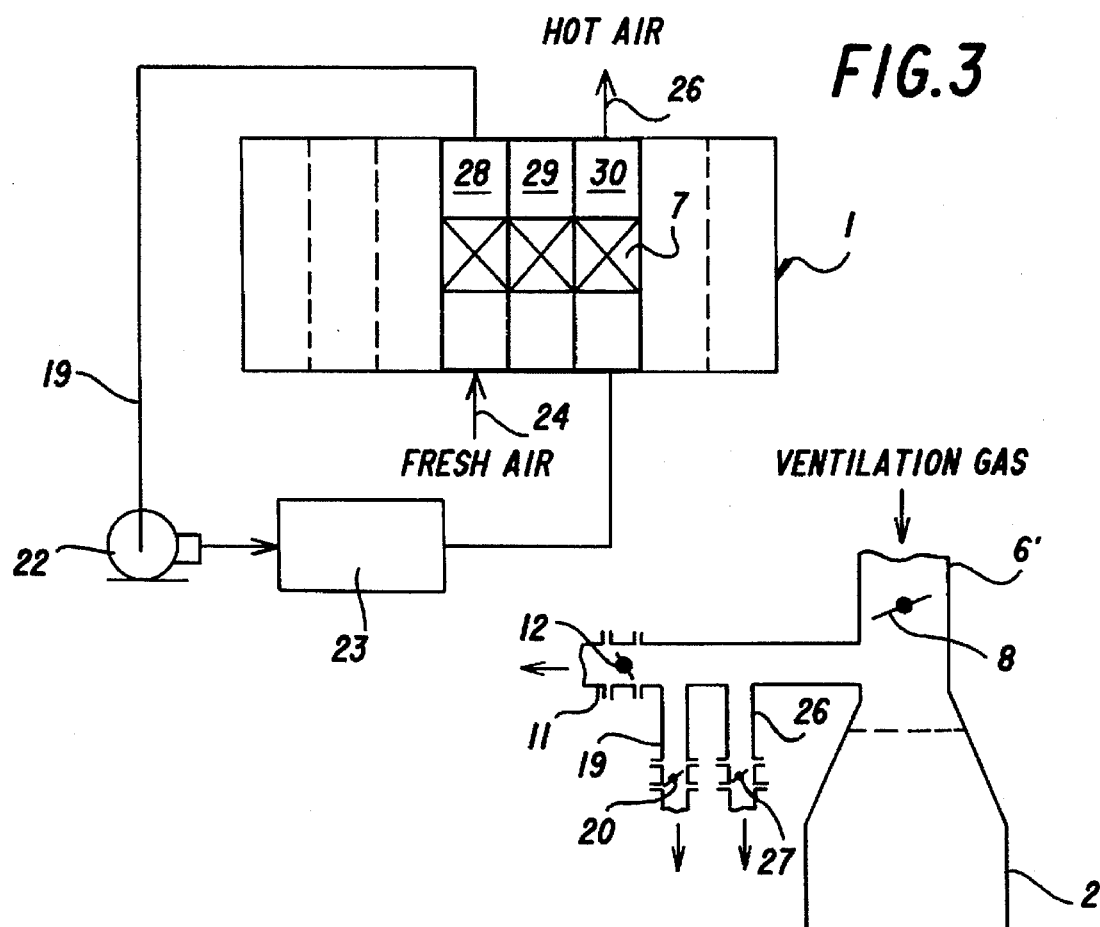
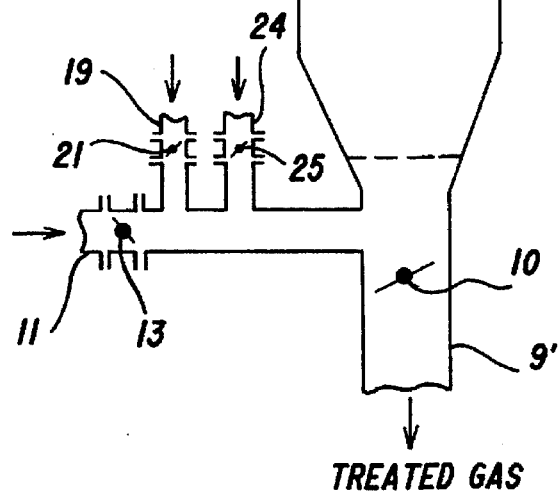

NOX ADSORPTION AND REMOVAL APPARATUS

BACKGROUND OF THE INVENTION

1. Field of the Invention

The present invention relates to an adsorption and removal method for efficiently removing nitrogen oxides (NOx) of low concentration contained in ventilation gas in various tunnels including various road tunnels, mountain tunnels, submarine tunnels, underground tunnels, and roads with shelter.

In various road tunnels, mountain tunnels, underground tunnels, roads with shelter and the like (these are collectively called "road tunnels" in the specification), particularly in those of long distance and heavy traffic volume, ventilation of a considerable volume is necessary for protection of health of passers and improvement of the distance of clear vision. Besides, in relatively short tunnels, in an urban or suburban district, the tunnel air must be aspirated and exhausted (ventilated) as means of preventing air pollution by carbon monoxide (CO) or NOx, etc. concentrated at the entrance and exit.

However, if the ventilation gas is directly scattered around, it is not regional environmental improvement, but is a mere spread of automotive exhaust and expands the highly polluted area in the urban or suburban district. As the pollution control means of existing roads, where tunnels and shelters are installed, the situation is exactly the same.

The invention relates to an adsorption and removal method for efficiently removing NOx of low concentration contained in the ventilation gas of such road tunnels.

As the characteristics of the ventilation gas of various tunnels, the concentration of NOx contained therein is low, about 10 ppm or less, the gas temperature is 100° C. or less, or usually ordinary temperature, and the gas volume fluctuates significantly depending on the traffic volume.

2. Description of the Prior Art

The inventors proposed a purification apparatus of ventilation gas of road tunnel for the purpose of efficiently adsorbing and removing NOx of low concentration, which is a rotary NOx adsorption and removal apparatus mainly constituted with a honeycomb block NOx adsorbent rotor composed of plate adsorbent bearing Ru or Ce on $TiO_2$, comprising a NOx adsorption zone, a preheating zone for preheating the unregenerated adsorbent ahead of the adsorption zone in the rotating direction, an adsorbent regeneration zone ahead of the preheating zone in the rotating direction, and a cooling zone for cooling the regenerated adsorbent ahead of the regeneration zone in the rotating direction (see the Japanese Laid-open Patent No. 3-258324). This apparatus is capable operating the entire system continuously, does not need frequent opening and closing of the valves and dampers, is easy to operate, and is excellent in durability.

However, the rotary NOx adsorption apparatus of this constitution has the following problems.

(1) A large mechanical strength is required on the sliding surface of the adsorbent rotor. (2) The sealing performance is poor on the sliding surface of the adsorbent rotor. (3) It is hard to manufacture rotors of large aperture. (4) The adsorbent rotor parts in the regeneration process do not contribute to the gas purification function, and a huge volume of adsorbent is needed for required performance. That is, about a half volume of the adsorbent rotor is always regenerated, and the adsorbent does not contribute effectively to the NOx adsorption. (5) The regeneration time and adsorption time are linked, and the times cannot be combined freely.

It is hence a primary object of the invention to present a NOx adsorption and removal apparatus solving all these problems.

In a purification apparatus of road tunnel ventilation gas, in most cases, the operation is limited to the daytime only when the traffic is heavy, and the operation is stopped or in stand-by in the midnight when the traffic volume is extremely small. Accordingly, the invention presents a system capable of extending the adsorption time significantly, by stopping continuous regeneration treatment of adsorbent by the rotary NOx adsorption apparatus and using the whole volume of adsorbent in adsorption.

SUMMARY OF THE INVENTION

The NOx adsorption and removal apparatus of the invention is devised to achieve the above object, and is employed in the method of passing NOx containing gas into the adsorber filled with NOx adsorbent to adsorb NOx on the adsorbent, passing hot air into the adsorber to desorb NOx, and regenerating the adsorbent, in which the adsorber is divided in plural zones arranged parallel in the gas flow direction.

In this NOx adsorption and removal apparatus, NOx is adsorbed in all or part of the zones, and then the adsorbent is regenerated.

In this regeneration method, the NOx containing air exhausted from each zone is led into hot air circulation line for regeneration, and is recycled. This hot air circulation line for regeneration comprises hot air circulation blower, heater, $NH_3$ injector, $NH_3$ reducing denitration reactor, and, preferably, SOx absorber.

In the NOx adsorption and removal apparatus, by passing fresh air into the regeneration completing zone, the obtained hot air is passed into the regeneration waiting zone, and cooling of the regeneration completing zone is effected simultaneously with preheating and preliminary dehumidification of regeneration waiting zone. The air used in this preheating and preliminary dehumidification method is injected into the upstream of the SOx absorber of the above circulation line.

As the absorbent to fill up the SOx absorber, it is preferred to use a hydroxide of alkaline earth metal deposited on an inorganic porous matter. Examples of inorganic porous matter include $SiO_2$, $AlO_3$, and $TiO_2$, and examples of alkaline earth metal are Ca, Ba, and Mg.

To complete regeneration during stand-by of the apparatus, the adsorber should be preferably divided into 8 to 10 zones, because the time required to regenerate each zone is 2 to 3 hours (the regeneration time of one zone is 1 to 1.5 hours, and the preheating time of one zone is 1 to 1.5 hours).

In the purification apparatus of road tunnel ventilation gas, preferably, NOx is adsorbed in the daytime when the traffic volume is heavy, and the adsorbent is regenerated in the midnight when the traffic volume is extremely small. Accordingly, the whole volume of adsorbent can be used in adsorption, and the adsorption time can be extended significantly. Depending on the case, however, each zone can be regenerated during adsorption operation except during stand-by, and continuous operation is possible continuously.

In the NOx adsorption and removal apparatus of the invention, the adsorber is divided in plural zones arranged parallel in the gas flow direction, and NOx is adsorbed in all or part of the zones, and then the adsorbent is regenerated, so that the regeneration equipment is reduced in size, while the energy is saved by effective utilization of preheat.

Besides, by adsorbing NOx in the daytime when the traffic is heavy and regenerating the adsorbent in the midnight when the traffic volume is extremely small, the whole volume of adsorbent can be used in adsorption, and the adsorption time can be extended substantially. Depending on the case, furthermore, it is also possible to regenerate in other zone during adsorption operation, and continuous operation is possible, in principle.

BRIEF DESCRIPTION OF THE DRAWINGS

FIG. 3 is a schematic diagram showing preheating and dehumidifying line in a NOx adsorption and removal apparatus provided with eight-division adsorber (adsorbing and regenerating line is not shown).

FIG. 4 is a schematic diagram showing one zone of adsorber.

DESCRIPTION OF THE PREFERRED EMBODIMENTS

Figure 1:
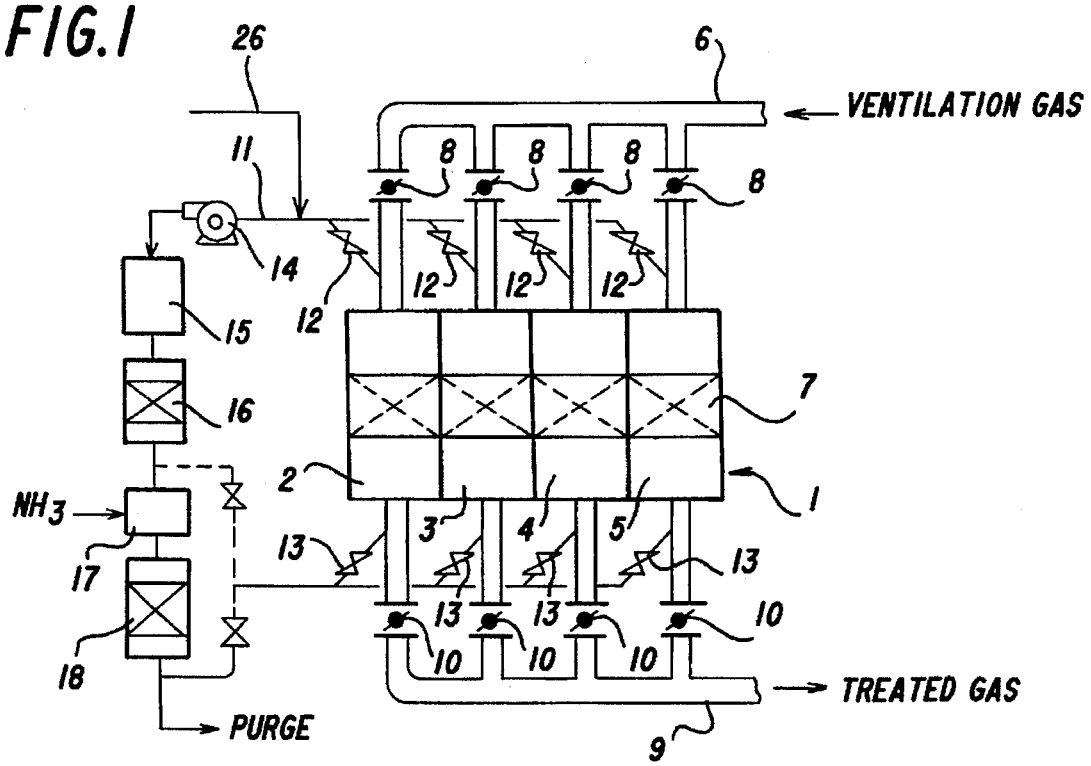
FIG. 1 is a schematic diagram showing adsorbing and regenerating line in a NOx adsorption and removal apparatus provided with four-division adsorber (preheating and dehumidifying line is not shown).
Figure 2:
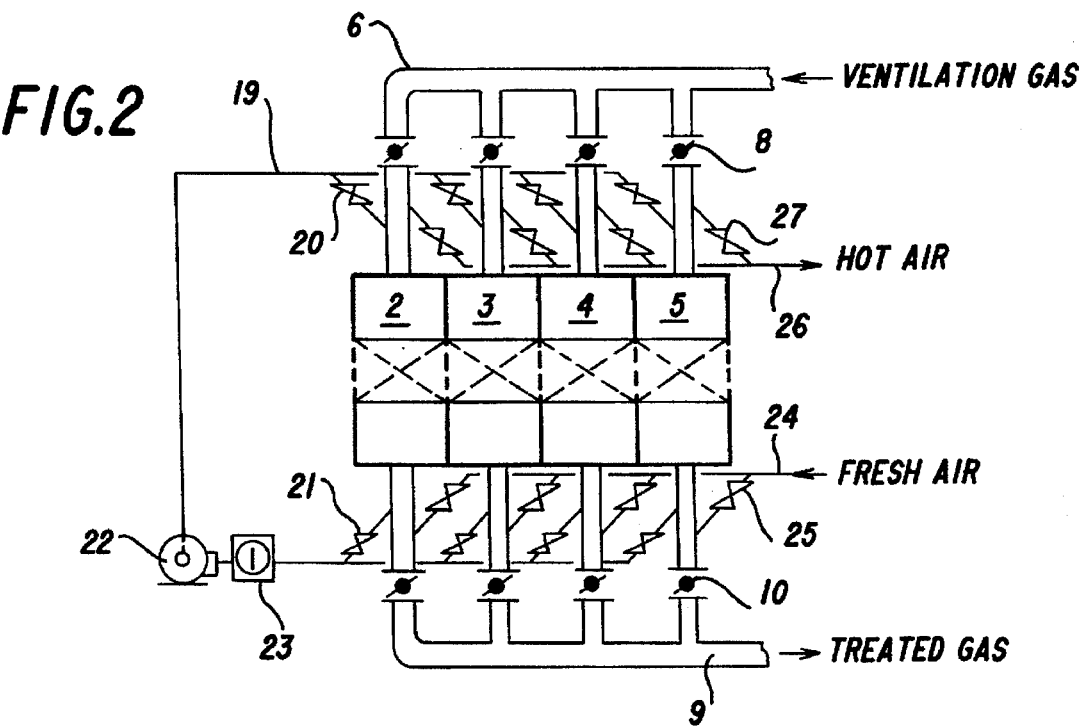
FIG. 2 is a schematic diagram showing preheating and dehumidifying line in a NOx adsorption and removal apparatus provided with four-division adsorber (adsorbing and regenerating line is not shown).

FIG. 1 shows the adsorbing and regenerating line in the NOx adsorption and removal apparatus of the invention. The preheating and dehumidifying line is not shown in the diagram. FIG. 2, to the contrary, shows the preheating and dehumidifying line of the NOx adsorption and removal apparatus, not showing the adsorbing and regenerating line.

In FIG. 1, the NOx adsorption and removal apparatus of the invention is used in a method of passing NOx containing gas into the adsorber 1 filled with NOx adsorbent 7 to adsorb a specific volume of NOx on the adsorbent, passing hot air into the adsorber 1 to desorb NOx, and regenerating the adsorbent. In this NOx adsorption and removal apparatus, the adsorber 1 filled with NOx adsorbent 7 is divided into four zones 2, 3, 4, 5 arranged parallel in the gas flow direction. The branch ducts of a gas lead pipe 6 have a damper 8, which are connected to the top of the zones 2, 3, 4, 5 respectively. The branch ducts of a gas exhaust pipe 9 have a damper 10, which are connected to the bottom of the zones 2, 3, 4, 5 respectively.

In the adsorber 1, a hot air circulation line for regeneration 11 is distributed to come out of the top and 9o into the bottom of the zones 2, 3, 4, 5, and the upstream branch ducts of the line 11 have a valve 12, which communicate with the top of the zones 2, 3, 4, 5 respectively. The downstream branch ducts of the line 11 also have a valve 13, which communicate with the bottom of the zones 2, 3, 4, 5 respectively. In the hot air circulation line for regeneration, a hot air circulation blower 14, a heater 15, a SOx absorber 16, an NH$_3$ injector 17, and an NH$_3$ reducing denitration reactor 18 are provided in series.

In FIG. 2, in the adsorber, a hot air circulation line for preheating 19 is distributed to come out of the top and going to the bottom of the zones 2, 3, 4, 5, and the upstream branch ducts of the line 19 have a valve 20, which communicate with the top of the zones 2, 3, 4, 5 respectively. The downstream branch ducts of the line 19 also have a valve 21, which communicate with the bottom of the zones 2, 3, 4, 5 respectively. In the hot air circulation line for preheating 19, a preheating air blower 22 and a preheater 23 are provided.

In the bottom of the zones 2, 3, 4, 5, a fresh air feed line 24 is distributed, and the branch ducts of the line 24 have a valve 25, which communicate with the bottom of the zones 2, 3, 4, 5 respectively. On the top of the zones 2, 3, 4, 5, a hot air exhaust line 26 is distributed, and the branch ducts of the line 26 have a valve 27, which communicate with the top of the zones 2, 3, 4, 5 respectively. The outlet of the hot air exhaust line 26 is connected to the hot air circulation line for regeneration 11 shown in FIG. 1 ahead of the flow of the hot air circulation blower 14.

In thus constituted NOx adsorption and removal apparatus, the ventilation gas to be treated in road tunnel is introduced into one zone 2 through the gas lead pipe 6 to pass through its adsorption bed, so that NOx in the gas is adsorbed and removed from the exhaust gas. The purified treated gas is discharged out of the system through the gas exhaust pipe 9.

The zone adjacent to this zone 2 in the adsorption state is the regeneration completing zone 3, and its opposite neighbor is the regeneration zone 4, and the further opposite neighbor is the regeneration waiting zone 5. In the regeneration zone 4, the adsorbent adsorbing NOx for specific time is regenerated. That is, the hot air for preheat coming out of the hot air exhaust line 26 is introduced into the line 11 by the hot air circulation blower 14 of the hot air circulation line for regeneration 11, heated by the heater 15, SOx is removed in the SOx absorber 16, and the gas is denitrated in the NH$_3$ reducing denitration reactor 18 by using NH$_3$ from the NH$_3$ injector 17 as reducing agent, and part of the denitrated gas is purged, and the remainder is circulated into the bottom of the regeneration zone 4 as hot air for regeneration, and passed into the filling bed of the zone. As the absorbent to fill up the SOx absorber, Ca(OH)$_2$, Ba(OH)$_2$, or Mg(OH)$_2$ is borne on an inorganic porous matter such as SiO$_2$, AlO$_3$, TiO$_2$ or the like.

The NOx containing air exhausted from the top of each zone is discharged into the hot air circulation line for regeneration 11, and is recycled as mentioned above.

As shown in FIG. 2, fresh air for cooling is passed into the regeneration completing zone 3 of high temperature through the fresh air lead line 24 to cool the zone, and obtained hot air is sucked into the hot air circulation line for preheating 19 by the preheating air blower 22, and is passed into the regeneration waiting zone 5 after temperature adjustment by the preheater 23. In this way, while cooling the regeneration completing zone 3 of high temperature by fresh air, the adsorbent in the regeneration waiting zone 5 is preheated to 110° to 120° C. by the produced hot air, and at the same time a large volume of moisture is desorbed, and a small volume of reversible adsorbing NOx, SOx are desorbed.

The hot air coming out of the regeneration waiting zone 5 is not discharged outside the system, but is injected into the upstream of the hot air circulation blower 14 of the hot air circulation line for regeneration 11 as mentioned above from the top of the regeneration waiting zone 5 by the hot air exhaust line 26. This hot air is thus heated as mentioned above, and desulfurized and denitrated, and part of the denitrated gas is purged, and the remainder is circulated to the bottom of the regeneration waiting zone 5 as hot air for regeneration.

The moisture brought into the hot air circulation line for regeneration 11 by the hot air is equivalent to the humidity exhausted by the purge gas, and is basically same as the mean humidity concentration of the hot air, but since the regeneration temperature is high, it is not adsorbed on the NOx adsorbent.

Since the purge gas is clean and hot, it can be directly discharged out of the system, but for further saving of energy, during operation of the NOx adsorption and removal apparatus, purge gas may be mixed into the ventilation gas to be treated upstream of the NOx adsorption bed, and the ventilation gas is raised in temperature, if slightly, to lower the relative humidity, so that the NOx adsorption efficiency is raised. More preferably, by heat exchange of the purge gas with the hot air in the hot air circulation line for preheating 19, the load of the preheater 23 in the line is alleviated.

FIG. 3 shows a modified example of the adsorber 1 filled with NOx adsorbent 7. In this example, in the NOx adsorption and removal apparatus, the adsorber 1 is divided into eight zones arranged parallel in the gas flow direction and which includes regeneration completing zone 28, regeneration zone 29, and regeneration waiting zone 30. Same as in FIG. 2, fresh air for cooling is passing into a regeneration completing zone 28 of high temperature by the fresh air lead line 24 to cool the zone, and the obtained hot air is sucked into the hot air circulation line for preheating 19 by the preheating air blower 22, and is passed into a regeneration waiting zone 30 after temperature adjustment by the preheater 23.

FIG. 4 shows a zone in the adsorber. In FIG. 4, reference numerals 6' and 9' are main gas branch ducts.

The flow direction and flow rate of gas or air are automatically or manually controlled by opening or closing the valves or dampers of the lines.

Shown below is a conceptual design example of an apparatus for purifying ventilation gas to be treated in a road tunnel with a gas treating capacity of 1 million Nm³/hr.

1. Treated gas 1,000,000 Nm³/hr

NOx: 3 ppm, $SO_2$: 0.3 ppm

Temperature: 25° C.

Relative humidity: 65%

2. Adsorption bed (mean NOx purification rate 85%, adsorption time: 12 hours):

6 m×14 m×2 m high

Differential pressure A: 30 mmAq

One zone of 8 divisions 3 m×3.5 m×2 m high

Gas flow rate 125,000 Nm³/hr

3. Main gas branch duct 1.3 m×1.3 m

4. Regenerated circulation gas 12,500 Nm³/hr,

Tube dia. 500 mm

5. Cooling, preheating gas 6,250 Nm³/hr,

Tube dia. 350 mm

Figure 5:
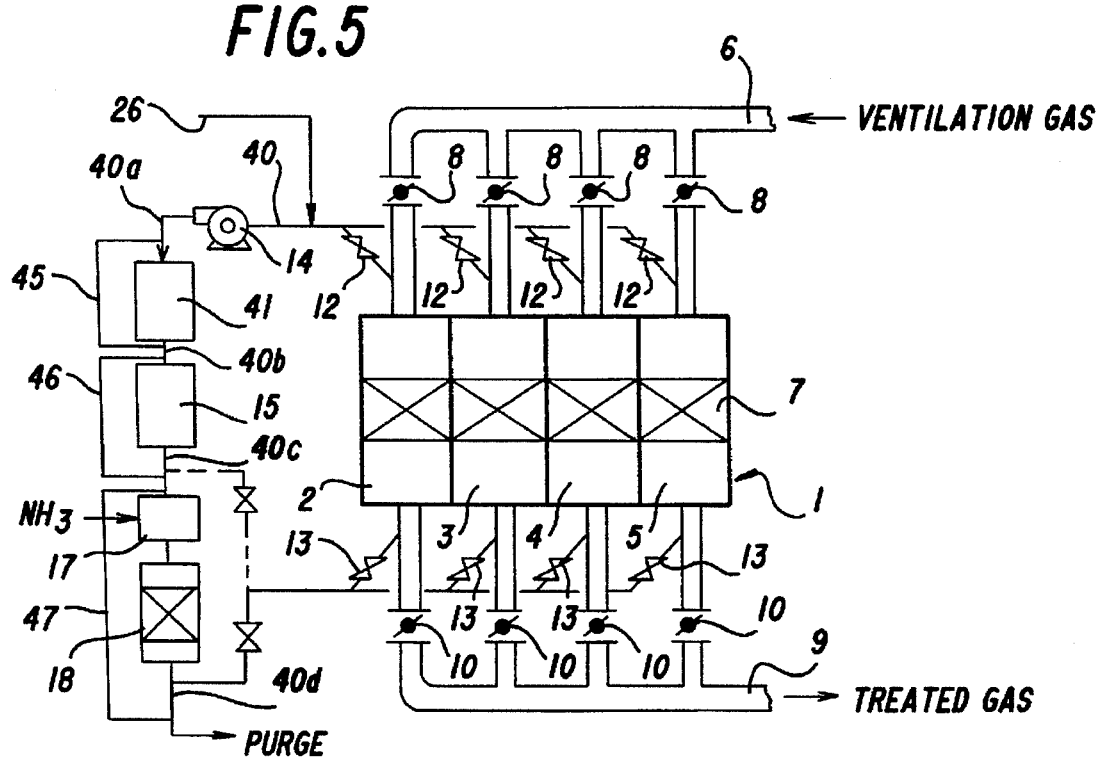
FIG. 5 is a schematic diagram corresponding to FIG. 1 showing other embodiment of the adsorbing and regenerating line in a NOx adsorption and removal apparatus.
Figure 6:
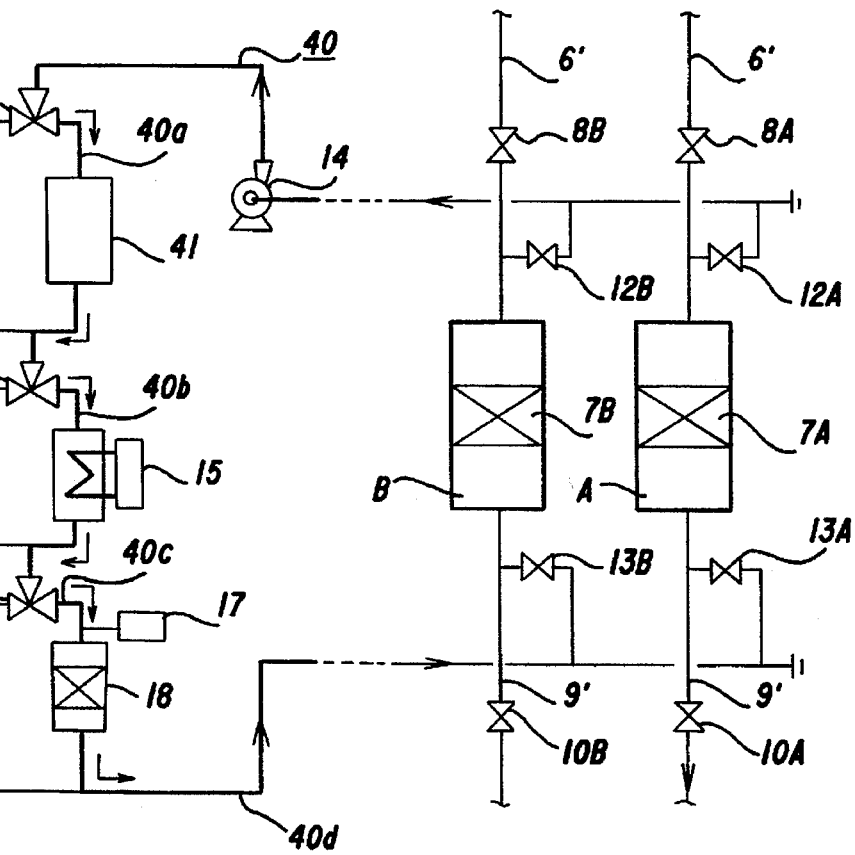
FIG. 6 is a schematic diagram showing the heating state of regeneration zone by adsorbing and regenerating line in FIG. 5.
Figure 7:
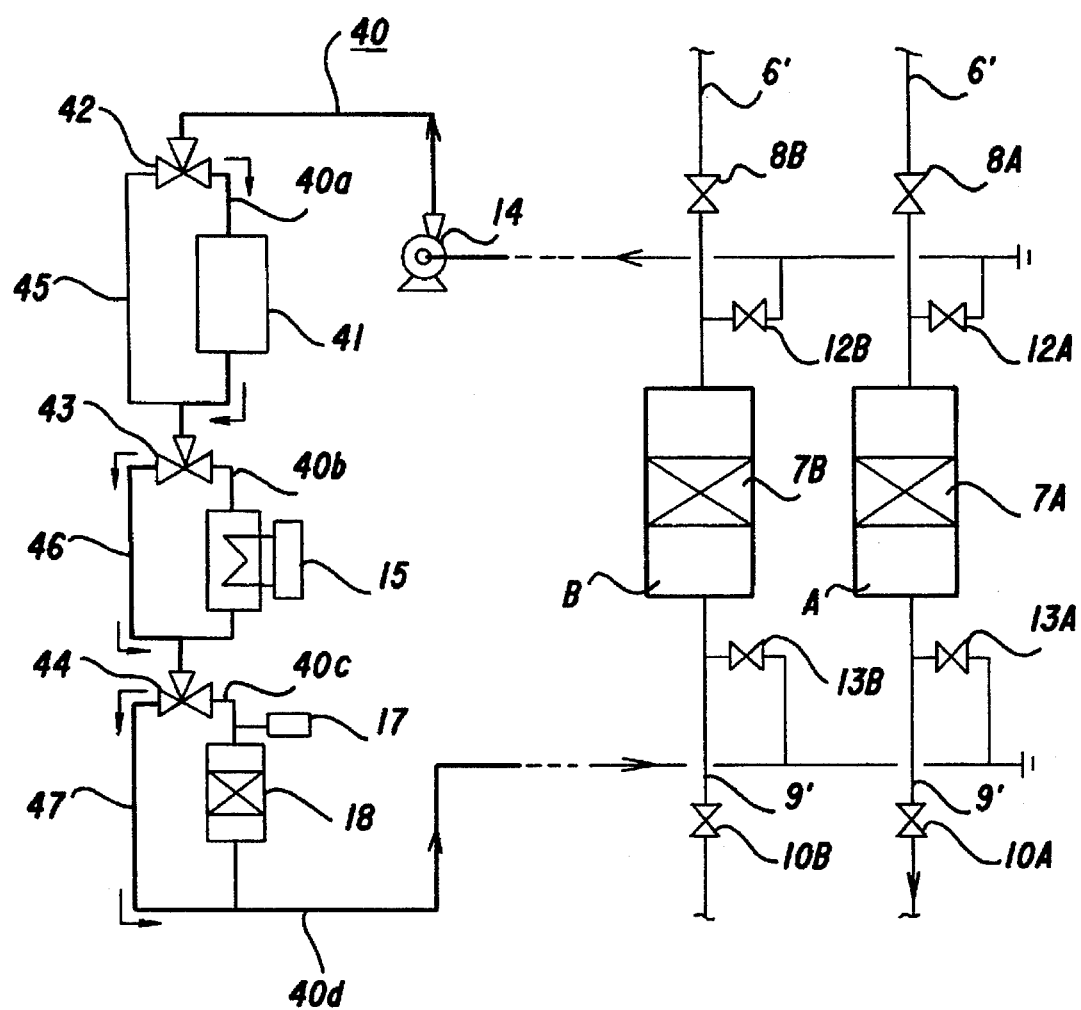
FIG. 7 is a schematic diagram showing the cooling state of regeneration zone by adsorbing and regenerating line in FIG. 5.

FIG. 5 through FIG. 7 show other embodiments of the adsorbing and regenerating line in the NOx adsorption and removal apparatus of the invention. In the following descriptions, the same parts as in FIG. 1 are identified with same reference numerals, and their explanations are omitted.

As shown in FIG. 5, in this embodiment, in a hot air circulation line for regeneration 40 coming out of the top of the zones 2, 3, 4, 5 and going into the bottom of the zones 2, 3, 4, 5, gas circulation blower 14, heat reserve tank 41, heater 15, $NH_3$ injector 17, and $NH_3$ reducing denitration reactor 18 are provided in series. Besides, the hot air circulation line for regeneration 40 comprises, aside from main line passing through the gas circulation blower 14, heat reserve tank 41, heater 15, $NH_3$ injector 17, and $NH_3$ reducing denitration reactor 18, a heat reserve tank circuit line 45 directly coupling the front flow and rear flow of the heat reserve tank 41, a heater circuit line 46 directly coupling the front flow and rear flow of the heater 15, and a denitration reactor circuit line 47 directly coupling the front flow of the $NH_3$ injector 17 and the rear flow of the $NH_3$ reducing denitration reactor 18.

The heat reserve tank 41 is filled with heat reserve material in honeycomb structure composed of, for example, stainless steel sheets. The heat reserve tank 41 exchanges heat between the heat reserve material and the circulation gas.

When heating the adsorbent 7 to regeneration temperature, while heating by the heater 15, the circulation gas is heated by making use of the heat reserved in the heat reserve tank 41, and the adsorbent 7 is preheated by this gas. Subsequently, the circulation gas is heated by the heater 15 alone, and the adsorbent 7 is heated by this heated gas. The heat reserve material in the heat reserve tank 41 is cooled by this release of heat. After regeneration of the adsorbent, when cooling the regenerated adsorbent 7 to adsorption temperature, the heated gas through the regenerated adsorbent 7 is passed through the heat reserve tank 41 to produce cooling gas, and the adsorbent 7 is precooled by this gas, and then the adsorbent 7 is cooled by the fresh air. Along with this precooling, the heat is reserved in the heat reserve tank 41.

As specifically shown in FIG. 6 and FIG. 7, the upstream end of the heat reserve tank circuit line 45 is connected to the outlet port of a first three-way valve 42 provided on the way of the main line 40a extended from the gas circulation blower 14 to the heat reserve tank 41, and by changing over this three-way valve 42, the gas may be circulated either through the heat reserve tank 41 or by skipping the heat reserve tank 41. The downstream end of the heat reserve tank circuit line 45 is connected to the inlet port of a second three-way valve 43 provided on the way of the main line 40b extended from the heat reserve tank 41 to the heater 15. The upstream end of the heater circuit line 46 is connected to the outlet port of the second three-way valve 43, and by changing over the second three-way valve 43, the gas may be circulated either through the heater 15 or by skipping the heater 15. The downstream end of the heater circuit line 46 is connected to the inlet port of a third three-way valve 44 provided on the way of the main line 40c extended from the heater 15 to the $NH_3$ reducing denitration reactor 18. The upstream end of the denitration reactor circuit line 47 is connected to the outlet port of the third three-way valve 44, and by changing over the third three-way valve 44, the gas can be circulated either through the denitration reactor 18 or by skipping the denitration reactor 18. The downstream end of the denitration reactor circuit line 47 is connected to the main line 40d coming out of the denitration reactor 18.

The changeover operation of the three-way valves 42, 43, 44 is done automatically by a control device (not shown).

Steps of regeneration of adsorbent by this NOx adsorption and removal apparatus, including auxiliary heating before regeneration and preliminary cooling after regeneration, are explained below by referring to FIG. 6 and FIG. 7. In the diagrams, the right-side zone is the adsorption zone A, and the left-side zone is the regeneration zone B. In the adsorption zone A containing adsorbent 7A, the damper 8A of the branch duct 6' of the gas lead pipe 6, and the damper 10A of the branch duct 9' of the gas exhaust pipe 9 are both open, and the branch valves 12A, 13A at both ends of the hot air circulation line for regeneration 40 are both closed. In the regeneration zone B, the damper 8B of the branch duct 6' of the gas lead pipe 6 and the damper 10B of the branch duct 9' of the gas exhaust pipe 9 are both closed, and the branch valves 12B, 13B at both ends of the hot air circulation line for regeneration 40 are both open.

When regenerating the adsorbent 7B in the regeneration zone B, first as indicated by arrow and thick line in FIG. 6, the first, second and third three-way valves 42, 43, 44 are changed over so that the gas may circulate in the main lines 40a, 40b, 40c and 40d. As a result, the gas is heated by the sensible heat of the heat reserve material in the heat reserve tank 41, and is further heated by the heater 15, and is denitrated by the $NH_3$ reducing denitration reactor 18, and is passed into the regeneration zone B, so that the adsorbent 7B in the regeneration zone B is heated gradually. On the other hand, the heat reserve material in the heat reserve tank 41 is gradually cooled by heat exchange with the circulation gas. When the temperature of the circulation gas becomes higher than that of the heat reserve material, the first three-way valve 42 is changed over, and, although not shown, the gas circulates in the heat reserve tank circuit line 45, main line 40b through the heater 15, and main line 40c through the $NH_3$ reducing denitration reactor 18. In this way, the adsorbent 7B in the regeneration zone B is heated to the regeneration temperature (200° to 400° C.), and regenerated.

The adsorbent 7B after regeneration is cooled to adsorption temperature, and in the NOx adsorption and removal apparatus of the embodiment, prior to cooling by the fresh air lead line 24 shown in FIG. 2, the adsorbent 7B is precooled in the hot air circulation line for regeneration 40. That is, when regeneration of the adsorbent 7B in the regeneration zone B is over, as indicated by arrow and thick line in FIG. 7, the three-way valves 42, 43, 44 are changed over so that the gas passing through the adsorbent 7B may circulate in the main line 40a through the heat reserve tank 41, heater circuit line 46, and denitration reactor circuit line 47. While the gas passes through the adsorbent 7B, the adsorbent 7B is precooled and the gas is heated, and the heat reserve material in the heat reserve tank 41 is gradually heated by heat exchange with the heated circulation gas. When the temperature of the heat reserve material and that of the circulation gas are equalized, the branch valves 12B, 13B at both ends of the hot air circulation line for regeneration 40 are both closed and the gas circulation is stopped. Afterwards, the adsorbent 7B is cooled by the fresh air from the fresh air lead line 24 shown in FIG. 2.

In the apparatus of the embodiment, by effectively utilizing the sensible heat of the heat reserve material in the heat reserve tank 41, the time required for heating and cooling the NOx adsorbent is shortened. Moreover, since the heat reserve tank 41 and heater 15 are both used for heating, the electric energy is saved as compared with the constitution of heating by the heater 15 alone.

We claim:

1. A NOx adsorption and removal apparatus for use in a method comprising passing NOx containing gas into an adsorber filled with NOx adsorbent to adsorb NOx on the adsorbent, passing hot air into the adsorber to desorb NOx, and regenerating the adsorbent, the apparatus comprising an adsorber filled with NOx adsorbent and divided in plural parallel zones, a gas lead pipe connected to an inlet end of each zone of the adsorber, a gas exhaust pipe connected to an outlet end of each zone of the adsorber, and an air circulation line for regeneration of the adsorbent which includes an air circulation blower and a heater and connects from the inlet end to the outlet end of each zone of the adsorber, the air circulation line for regeneration further includes a heat reserve tank for heating gases in the air circulation line during a regeneration stage of the NOx adsorbent by using heat contained in the heat reserve tank, and for cooling gases in the air circulation line after passage through regenerated adsorbent by storing heat of the gases as heat in the heat reserve tank after regeneration of the NOx adsorbent.

2. A NOx adsorption and removal apparatus of claim 1, wherein the air circulation line for regeneration comprises equipment selected from a group consisting of SOx adsorber, $NH_3$ injector, $NH_3$ reducing denitration reactor, and their combination.

3. A NOx adsorption and removal apparatus of claim 1, wherein the air circulation line for regeneration further includes a heater circuit line connected in parallel to the heater, and a heat reserve tank circuit line connected in parallel to the heat reserve tank.

* * * * *